(12) United States Patent
Kim

(10) Patent No.: US 7,571,755 B2
(45) Date of Patent: Aug. 11, 2009

(54) APPARATUS FOR REGULATING ROTATION SPEED OF ROLLER IN LAMINATOR

(76) Inventor: Suk-Kyou Kim, Daeyeong villa. 1-302, Gajwa 3, 278-21, Seo-gu, Incheon-si (KR) 404-254

( * ) Notice: Subject to any disclaimer, the term of this patent is extended or adjusted under 35 U.S.C. 154(b) by 600 days.

(21) Appl. No.: 10/550,332

(22) PCT Filed: Mar. 27, 2003

(86) PCT No.: PCT/KR03/00616

§ 371 (c)(1),
(2), (4) Date: Jun. 30, 2006

(87) PCT Pub. No.: WO2004/085136

PCT Pub. Date: Oct. 7, 2004

(65) Prior Publication Data

US 2006/0260758 A1 Nov. 23, 2006

(51) Int. Cl.
*B32B 37/00* (2006.01)
(52) U.S. Cl. .................. 156/555; 156/579; 156/582
(58) Field of Classification Search ............... 156/555, 156/580, 582, 583.1, 579; 100/327, 328, 100/334, 155 R, 160, 176

See application file for complete search history.

(56) References Cited

U.S. PATENT DOCUMENTS

| 6,874,555 | B1* | 4/2005 | Hsiao | 156/555 |
| 7,013,945 | B2* | 3/2006 | Kim | 156/555 |
| 7,406,993 | B2* | 8/2008 | Lin | 156/555 |

FOREIGN PATENT DOCUMENTS

| JP | 01-229731 | 4/1991 |
| JP | 19900091554 | 12/1991 |
| JP | 19900244959 | 4/1992 |
| JP | 19930280156 | 4/1995 |
| KR | 20-1999-0029980 | 6/2000 |
| KR | 20-2001-0032245 | 1/2002 |
| KR | 20-2002-0020828 | 10/2002 |

* cited by examiner

*Primary Examiner*—James Sells
(74) *Attorney, Agent, or Firm*—Saliwanchik, Lloyd & Saliwanchik

(57) ABSTRACT

There is provided an apparatus for adjusting a rotation speed of a roller in a laminator. In this apparatus, at least one of the roller gear connected with a roller and a motor gear connected with a motor is a two-stage shift gear in which teeth of the same shape are formed in two stages. A connection gear meshed with the first stage of the two-stage shift gear is provided with a recessed gear which includes a gear portion to be meshed with the first stage and a recessed portion whose outer circumference is recessively formed so that a second stage of the two-stage shift gear can be placed therein.

12 Claims, 21 Drawing Sheets

APPARATUS FOR REGULATING ROTATION SPEED OF ROLLER IN LAMINATOR

TECHNICAL FIELD

The present invention relates to an apparatus for regulating a rotation speed of roller in a laminator, and more particularly, to an apparatus for regulating a rotation speed of roller in a laminator that performs a laminating operation using one-way rotating motor, in which the rotation speed of the roller is regulated differently in forward and backward rotations. Specially, the present invention relates to an apparatus for regulating a rotation speed of the roller, in which forward and backward rotations of the roller using one-way rotating motor can be varied only through a user's simple manipulation in a small-sized laminator.

BACKGROUND ART

A laminator is a device that performs a coating operation using heat and pressure applied by a roller in a state that a to-be-coated plate-shaped member is inserted between laminating films.

Additionally, there are two types of the laminator. One is a large-sized laminator suitable for laminating large quantities and the other is a small-sized laminator suitable for laminating small quantities.

Specifically, the small-sized laminator for home use or portable has a simple construction in which a pair of rollers apply heat and pressure. Generally, the small-sized laminator employs one-way rotating motor so as to reduce its manufacturing cost and scale down its volume.

Accordingly, there is demanded a roller driving apparatus for a laminator, in which a roller can rotate in a backward direction so as to remove jammed films, as well as in one direction at a forward rotation.

FIG. 1 is a perspective view showing a roller driving apparatus of a conventional laminator.

Referring to FIG. 1, the roller driving apparatus of the conventional laminator includes one pair of supporting frames 31a and 31b facing each other, upper and lower rollers 33a and 33b installed between the supporting frames 31, upper and lower roller gears 34a and 34b coupled with each one end of the rollers 33 to transfer rotational forces of the rollers 33, one pair of connection gears 35a and 35b selectively coupled to the upper roller gear 34a and the lower roller gear 34b to transfer the rotational force, a motor gear 16 selectively transferring a rotational force of a motor M to the connection gears 35, a motor fixing member 32 to which the motor M is coupled, and a manipulating member 37 for manipulating a transfer direction of the connection gears 35 by using an external force.

FIG. 2 is an exploded perspective view showing the roller driving apparatus of the conventional laminator.

Referring to FIG. 2, the roller driving apparatus includes: one pair of upper and lower connection gears 35a and 35b; upper and lower gear shafts 39a and 39b inserted into central axes of the upper and lower connection gears 35a and 35b; a manipulating member 37 into which the upper and lower gear shafts 39a and 39b are inserted so as to be movable in correlation to the upper and lower gear shafts 39a and 39b and with which a user directly applies an external force upward and downward; and a fixing spring 38 for stably fixing positions of a central shaft 40 and the manipulating member 37 around the rotational center of the manipulating member 37.

In more detail, the manipulating member 37 includes upper and lower shaft fixing holes 371 and 373 and a spring guide 374. The upper and lower connection gears 35a and 35b are internally inserted into the upper and lower fixing holes 371 and 373, and the central shafts of the upper and lower connection gears 35, i.e., the upper and lower gear shafts 39a and 39b, are inserted thereinto, so that the upper and lower connection gears 35 are supported. The spring guide 374 has two guide faces that are in contact with central-shaft fixing holes 372 into which the central shaft 40 is inserted and a fixing spring 38 to thereby fix the position of the manipulating member 37.

Also, the upper and lower gear shafts 39a and 39b are inserted into the supporting frame 31b, the connection gears 35, the motor fixing member 32 and specially the manipulating member 37, so that the mesh state of the connection gears 35 is changed according to an external force applied by the user.

Further, the supporting frame 31b and the motor fixing member 22 include upper shaft guides 311 and 321 and lower shaft guides 313 and 323 into which the upper and lower gear shafts 39a and 39b are respectively inserted, and circular central holes 312 and 322 into which the central shaft 40 is inserted. Particularly, the upper shaft guides 311 and 321 and the lower shaft guides 313 and 323 are formed in an arc shape so that the upper and lower gear shafts 39a and 39b can be properly moved in left and right directions according to a change of positions of the connection gears 35. Furthermore, in order that the position of the fixing spring 38 is correctly fixed at both front and rear ends, spring inserting holes 314 and 324 having the same outward shape as the fixing spring 38 are further formed on each one side of the supporting frame 31b and the motor fixing member 32. At this time, the position of the fixing spring 38 can be fixed by pushing into the spring inserting holes 314 and 324.

Additionally, the roller driving apparatus further includes protrusions 318, 319, 329 and 330 for fixing positions of the upper and lower gear shafts 39a and 39b through the upper shaft guides 311 and 321 and the lower shaft guides 313 and 323. It is desirable that the protrusions 318, 319, 329 and 330 should be formed on an outside of the central shaft 40.

If the user moves the manipulating member 37 in upward and downward directions to thereby move the upper and lower connection gear 35a and 35b internally inserted into the manipulating member 37, the upper and lower connection gears 35a and 35b are meshed with the upper and lower roller gears 34a and 34b or separated therefrom, so that the rotational force whose transfer direction is changed into forward or backward direction is transferred.

The upper shaft guides 311 and 321 and the lower shaft guides 313 and 323 are formed on the supporting frame 31b and the motor fixing member 32 in the arc shape so as to guide the movement of the upper and lower gear shafts 39a and 39b.

Meanwhile, the change of the position of the connection gears 35 results in that of the mesh between the motor gear 36 and the roller gears 34 to thereby change the transfer direction of the rotational force, so that the forward and backward rotations of the rollers 33 are manipulated to the user's intentions.

In order to stably support the changed position of the manipulating member 37, the fixing spring 38 is inserted into the spring guide 374 so that a predetermined force is applied to the manipulating member 37.

Additionally, after the manipulating member 37 is moved upward or downward, the manipulating member 37 is hung between the supporting bar 327 and the supporting bar hanging projections 375, so that the position of the manipulating member 37 is fixed.

Further, after the upper gear shaft 39a and the lower gear shaft 39b moves to one side, the protrusions 318, 319, 329 and 330 firmly fix the positions of the upper and lower gear shaft 39a and 39b so that the upper and lower gear shafts 39a and 39b cannot be released unless a force is applied beyond a predetermined strength. Meanwhile, to make it possible to move the positions of the upper and lower gear shafts 39a and 39b by a predetermined force, it is desirable that at least one of the manipulating member 37 and/or the upper gear shaft 39a and the lower gear shaft 39b and/or the motor fixing member 32 and the right supporting frame 31b is formed of a plastic material with elasticity.

FIGS. 3 to 5 are views showing a forward rotation state, a backward rotation state and a stopped state of the roller in the conventional laminator, respectively.

Referring to FIG. 3, in case that the user pushes upwards the manipulating member 37 to change the position of the manipulating member 37 in a counterclockwise direction, the upper connection gear 35a is meshed with the motor gear 36 and the upper roller gear 34a. In the end, the rotational force of the motor is transferred to the upper roller 33a through the motor gear 36, the upper connection gear 35a and the upper roller gear 34a. Then, the upper roller gear 34a is meshed with the lower roller gear 34b to generate the rotational force of the lower roller gear 34b, so that the lower roller 33b also rotates with the same revolutions as the upper roller 34a.

At this time, the manipulating member 37 is in a state rotated in the counterclockwise direction around the central shaft 40. The upper gear shaft 39a is in contact with a left side of the arc-shaped upper shaft guide 321 and the lower gear shaft 39b is in contact with a right side of the arc-shaped lower shaft guide 323, thereby setting its position. The fixing spring 38 is in contact with a second guide face 374b of the spring guide 374 to apply a predetermined force to the manipulating member 37, so that the mesh of the upper connection gear 35a is not released even by a torque applied to the manipulating member 37 when the upper connection gear 35a rotates.

Referring to FIG. 4, in case that the user pushes downward the manipulating member 37 to rotate the position of the manipulating member 37 in a clockwise direction, the lower connection gear 35b is meshed with both the motor gear 36 and the lower roller gear 34b. As a result, the rotational force of the motor is transferred to the lower roller 33b through the motor gear 36, the lower connection gear 35b and the lower roller gear 34b. Also, the lower roller gear 34b is meshed with the upper roller gear 34a and generates the rotational force of the upper roller gear 34a, so that the upper roller 33a also rotates at the same revolutions as the lower roller 34b.

At this time, the manipulating member 37 is in a state rotated in the clockwise direction around the central shaft 40. The upper gear shaft 39a is in contact with a right side of the arc-shaped upper shaft guide 321 and the lower gear shaft 39b is in contact with a left side of the arc-shaped lower shaft guide 323, thereby setting its position. The fixing spring 38 is in contact with a first guide face 374a of the spring guide 374 to apply a predetermined force to the manipulating member 37, so that the mesh of the upper connection gear 35a is not released even by a torque applied to the manipulating member 37 when the upper connection gear 35a rotates.

Referring to FIG. 5, the user applies an external force to the manipulating member 37 to contact the fixing spring 38 with an edge of a central portion of the spring guide 374 without any contact with the guide faces 374a and 374b of the spring guide 374. In this state, any connection gears 35 are not meshed with the roller gears 34. Thus, the rotational force of the motor M is not transferred to the rollers 33. Also, it is possible to obtain a more stable operation by forming the spring guide with three faces At this time, the user can remove the rolled film from the laminator by directly pulling it out. However, the user should keep on holding the manipulating member 37 while the rolled film is removed.

It can be seen that the position of the supporting bar 327 is fixed more firmly because the supporting bar 327 is hung on the supporting hanging projections 357. Also, because the positions of the upper and lower gear shafts 39a and 39b are fixed to the protrusions 318, 319, 329 and 330, the position of the manipulating member 37 can be fixed more firmly.

However, according to the roller driving apparatus of the conventional laminator, the driving speed of the roller in the forward rotation is equal to that in the backward rotation, so that operation efficiency of the small-sized laminator is lowered.

For example, in order to apply heat and pressure for a predetermined time, it is desired that the laminator should carry out the forward rotation for a predetermined long time while the laminator rapidly carries out the backward rotation when the laminator rotates backward so as to remove a film. Accordingly, it is inefficient that the roller always rotates at the same speed in both the forward rotation and the backward rotation.

DISCLOSURE OF INVENTION

An object of the present invention is to provide an apparatus for adjusting a rotation speed of roller in a laminator, in which a laminating operation is performed more promptly by differently rotating forward and backward the roller of the laminator.

Particularly, while the roller rotates slowly in a normal operation of the laminator, the roller rotates fast when a film needs to be removed promptly.

Additionally, according to present invention, it is possible to conveniently vary the rotation speed by simply changing shapes of gears without any additional complex structure.

Further, speed ratio of the forward rotation and the backward rotation can be freely adjusted by properly changing the number of teeth of gears.

In accordance with an aspect of the present invention, there is provided an apparatus for adjusting a rotation speed of roller in a laminator, in which the laminator includes a pair of rollers, a pair of connection gears connected to one end of the rollers and forming one meshed pair, a motor fixing member and a motor, a motor gear fixed to a rotational axis to transfer a rotational force to the connection gears, and a manipulating member for manipulating a meshed state between the motor gear and the connection gears by moving the connection gear, wherein at least one of the roller gears and the motor gears is a two-stage shift gear, the two-stage shift gear having the same shaped teeth and formed in two stages, and the connection gear to be meshed with a first stage gear of the two-stage shift gear is a recessed gear, the recessed gear including a gear portion meshed with the first stage gear and a recessed portion in which an outer circumference is recessed so as to place a second gear of the two-stage shift gear therein.

In accordance with another aspect of the present invention, an apparatus for adjusting a rotation speed of a roller in a laminator comprises: a motor and a motor fixing member; a motor gear to which a torque generated from the motor is transferred; a pair of rollers for performing a laminating operation by applying heat and/or pressure; a roller gear provided with a two-stage shift gear having a stepped portion in which at least one of a pair of gears extended to one end of the rollers has same shape and different number of teeth formed on an outer circumference thereof; a pair of connection gears including at least one recessed gear in which teeth are formed on a predetermined outer circumference meshed with a first stage gear portion of the two-stage shift gear and a recessed portion is formed on an outer circumference where a second stage gear portion is placed, such that a torque generated from the motor gear is selectively transferred to the connection gears; a manipulating member for fixing the connection gear and applying an external force of a user; and a fixing member for fixing a position of the connection gears.

In accordance with further another aspect of the present invention, an apparatus for adjusting a rotation speed of a roller in a laminator comprises: a motor and a motor fixing member; a motor gear to which a torque is transferred form the motor, the motor gear being provided with a two-stage shift gear having a stepped portion in which same shape and different number of teeth are formed on an outer circumference thereof; a pair of rollers for performing a laminating operation by applying heat and/or pressure; a roller gear connected to one end of the roller; a pair of connection gears including at least one recessed gear in which teeth are formed on a predetermined outer circumference meshed with a first stage gear portion of the two-stage shift gear and a recessed portion is formed on an outer circumference where a second stage gear portion is placed, such that a torque generated from the motor gear is selectively transferred to one of the roller gears; a manipulating member for fixing the connection gear and applying an external force of a user; and a fixing member for fixing a position of the connection gears.

According to the present invention, a film jammed within a laminator can be more rapidly removed in a normal operation state by varying a rotation angles in forward and backward rotations of the roller.

Since it is possible to make the roller have different rotation speed in the forward rotation from that in the backward rotation by simply changing the shapes of gears, reliability of the products are increased.

Further, by providing gears with different number of teeth from each other, it is possible to implement various speeds even at a fixed rotation speed of the motor.

The present invention has an effect that speed ratio of the forward rotation and the backward rotation can be differently adjusted.

Specifically, in case of a small-sized laminator for home use, more excellent effect can be obtained.

BRIEF DESCRIPTION OF INVENTION

The accompanying drawings, which are included to provide a further understanding of the invention and are incorporated in and constitute a part of this specification, illustrate embodiments of the invention and together with the description serve to explain the principles of the invention.

BEST MODE FOR CARRYING OUT THE INVENTION

Hereinafter, preferred embodiments of the present invention will be described in detail with reference to accompanying drawings. Here, portions different from the related art will be described in detail while portions equal or similar to the related art will be described in short. In order to more clearly describe the preferred embodiments of the present invention, the same reference numbers as the related art are used in the same elements.

First Embodiment

Figure 1:
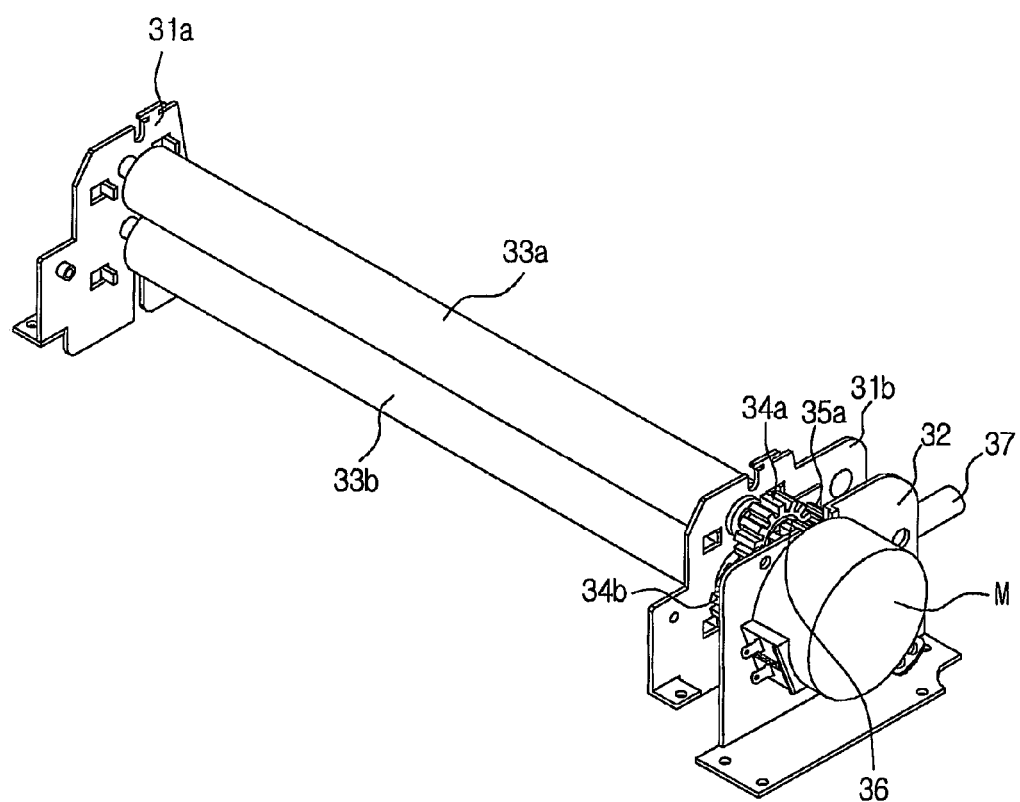
FIG. 1 is a perspective view of a roller driving apparatus of a conventional laminator.
Figure 2:
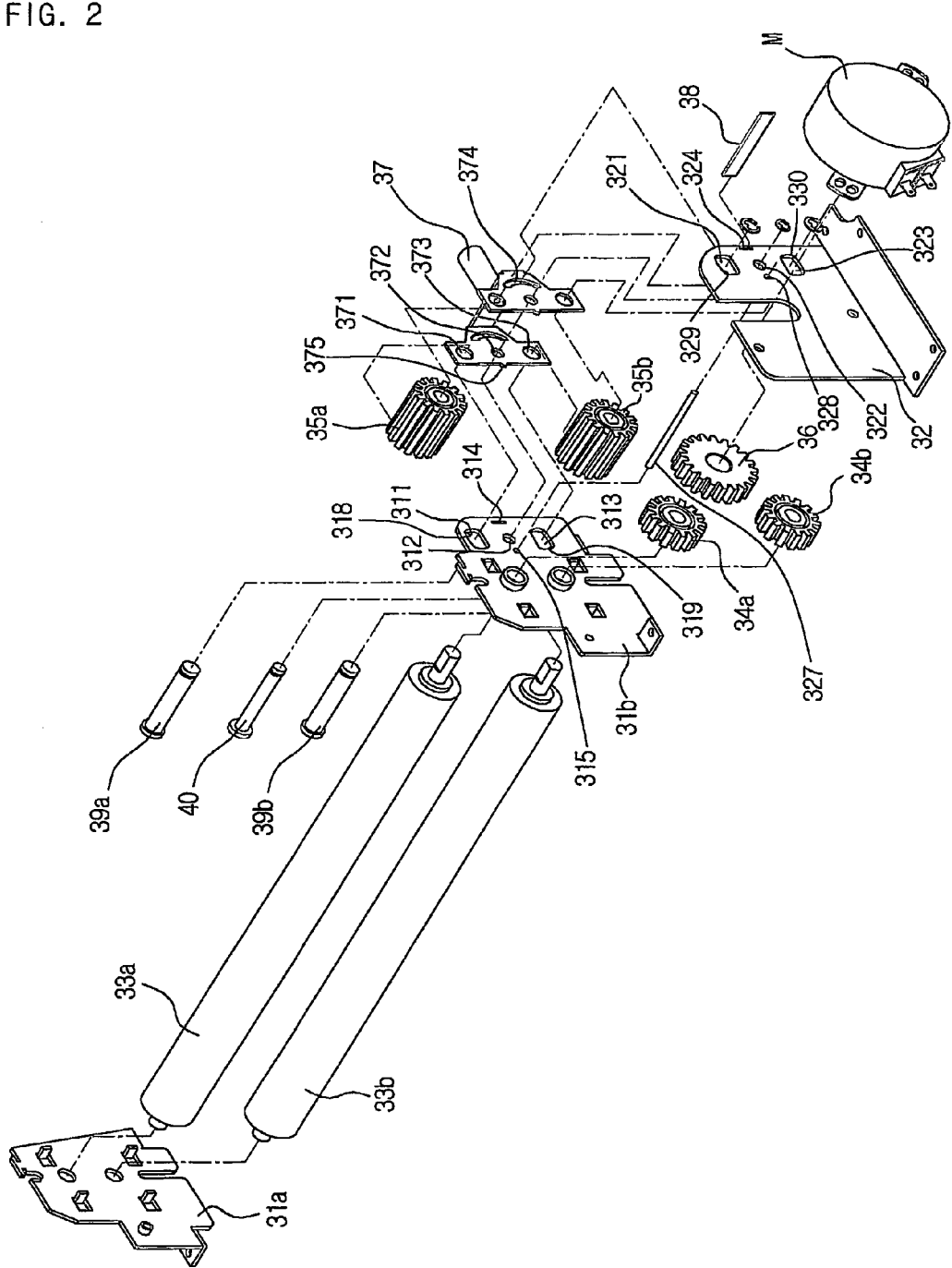
FIG. 2 is an exploded perspective view of the roller driving apparatus of the conventional laminator.
Figure 3:
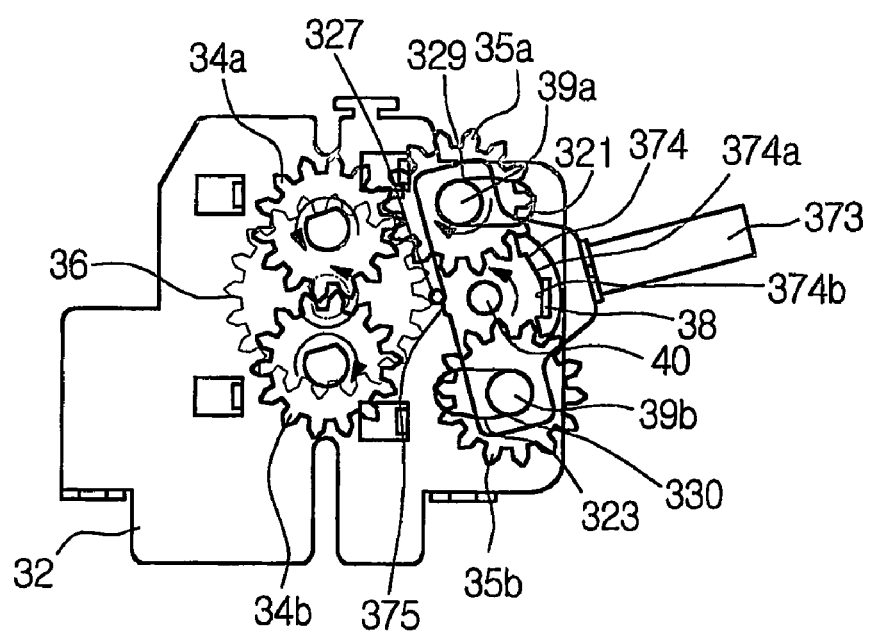
FIGS. 3 to 5 are views showing a forward rotation state, a backward rotation state and a stopped state of the roller in the roller driving apparatus of the conventional laminator, respectively.
Figure 4:
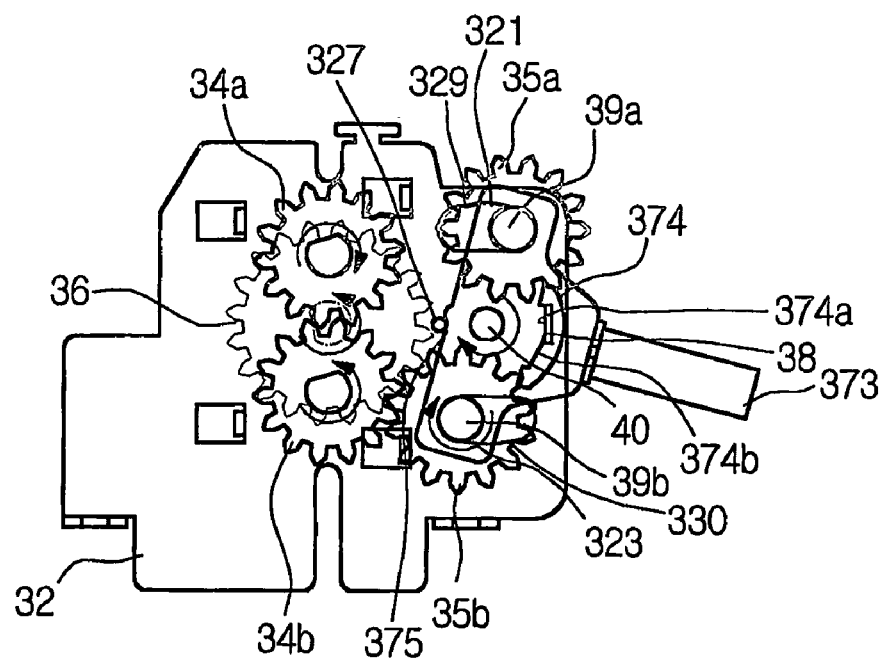
Figure 5:
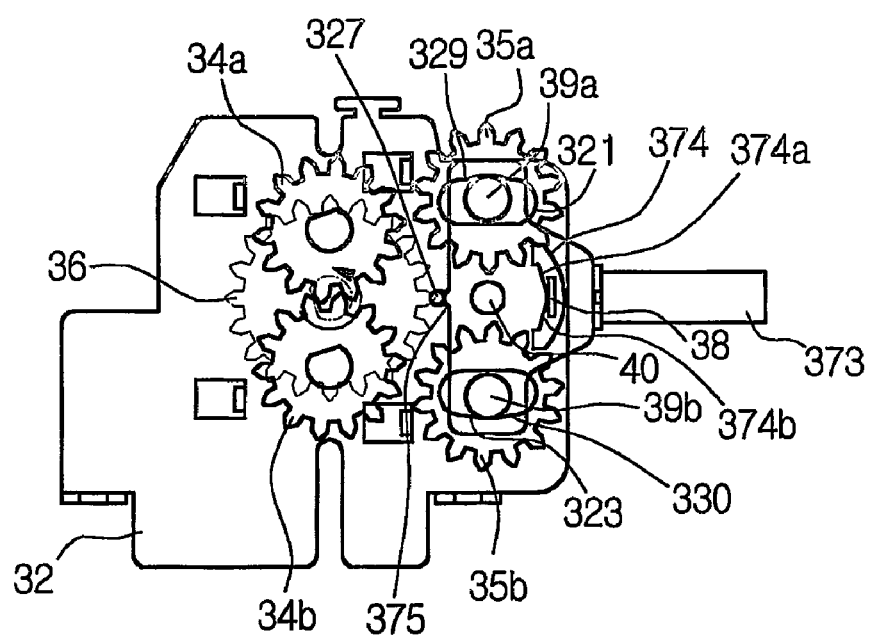
Figure 6:
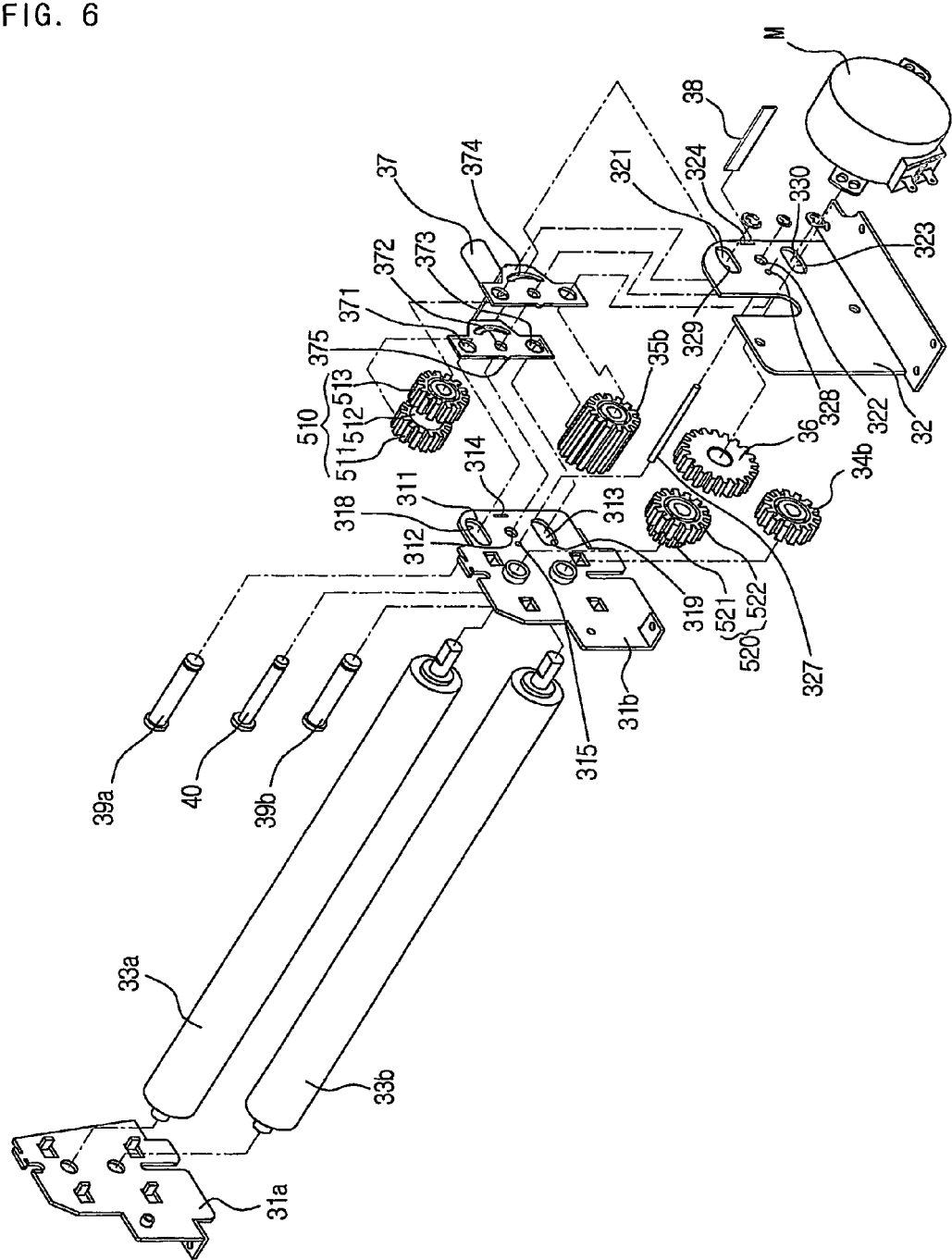
FIG. 6 is an exploded perspective view of an apparatus for regulating rotation speed of roller in a laminator according to a first embodiment of the present invention.

FIG. 6 is an exploded perspective view showing an apparatus for adjusting rotation speed of roller in a laminator in accordance with a first embodiment of the present invention.

Referring to FIG. 6, the apparatus includes: a center recessed gear 510 and a lower connection gear 35b, which are installed in upper and lower portion, respectively; upper and lower gear shafts 39a and 39b inserted into central axes of the center recessed gear 510 and the lower connection gear 35b; a manipulating member 37 into which the upper and lower gear shafts 39a and 39b are inserted so as to be movable in correlation to the upper and lower gear shafts 39a and 39b and through which a user directly applies an external force upward and downward; and a fixing spring 38 for stably fixing positions of a central shaft 40 and the manipulating member 37 around the rotational center of the manipulating member 37.

In more detail, the manipulating member 37 includes upper and lower shaft fixing holes 371 and 373 and a spring guide 374. The center recessed gear 510 and the lower connection gear 35b are internally inserted into the upper and lower fixing holes 371 and 373, and the central shafts of the center recessed gear 510 and the lower connection gear 35b, i.e., the upper and lower gear shafts 39a and 39b, are inserted thereinto, so that the center recessed gear 510 and the lower connection gear 35b are supported. The spring guide 374 has two guide faces that are in contact with central-shaft fixing holes 372 into which the central shaft 40 is inserted and a fixing spring 38 to thereby fix the position of the manipulating member 37.

Meanwhile, the center recessed gear 510 includes: a recessed portion 512 in which entire outer circumference is recessed at the center of the gear; a front gear 513 formed in front of the recessed portion 512 and meshed with a motor gear 36; and a rear gear 511 formed behind the recessed portion 512 and meshed with the two-stage shift gear 520. At this time, the recessed portion 512, the front gear 513 and the rear gear 511 are formed in a single body.

The two-stage shift gear 520 includes a low-speed gear 522 and a high-speed gear 521, which are formed in a single body. The low-speed gear 522 is meshed with the lower roller gear 34b to thereby transfer a toque upward and downward. The high-speed gear 521 is formed at a rear portion of the low-speed gear 522 and has a smaller radius and the smaller number of teeth than the low-speed gear 522.

Particularly, the high-speed gear 521 is meshed with the rear gear 511 of the center recessed gear 510, such that a torque is applied thereto from the rear gear 511. At this time, assuming that the front gear 513 of the center recessed gear 510 has the same number of teeth as the rear gear 511, the number of teeth of the high-speed gear 521 is smaller than that of the lower roller gear 34b and the low-speed gear 522. Therefore, when the high-speed gear 521 is meshed with the center recessed gear 510, the upper roller 33a and the lower roller 33b can rotate at high speed.

Also, if the rear gear 511 has the larger radius and the larger number of teeth than the front gear 513, it is apparent that the upper roller 33a and the lower roller 33b can rotate at higher speed.

Additionally, the upper and lower gear shafts 39a and 39b are inserted into the supporting frame 31b, the center recessed gear 510 and the lower connection gear 35b, the motor fixing member 32 and specially the manipulating member 37, so that the mesh state of the center recessed gear 510 and the lower connection gear 35b is changed according to an external force applied by the user.

Further, the supporting frame 31b and the motor fixing member 22 include upper shaft guides 311 and 321 and lower shaft guides 313 and 323 into which the upper and lower gear shafts 39a and 39b are respectively inserted, and circular central holes 312 and 322 into which the central shaft 40 is inserted. Particularly, the upper shaft guides 311 and 321 and the lower shaft guides 313 and 323 are formed in an arc shape so that the upper and lower gear shafts 39a and 39b can be properly moved in left and right directions according to a change of positions of the connection gears 35. Furthermore, in order to correctly fix the position of the fixing spring 38 at both front and rear ends, spring inserting holes 314 and 324 having the same outward shape as the fixing spring 38 are further formed on each one side of the supporting frame 31b and the motor fixing member 32. At this time, the position of the fixing spring 38 can be fixed by being forcedly inserted into the spring inserting holes 314 and 324.

Meanwhile, supporting bar inserting holes 315 and 328 are formed on predetermined positions of a right supporting frame 31b and a motor fixing member 32, respectively. Both ends of the supporting bar 327 are inserted into the supporting bar inserting holes 315 and 328 and fixed thereto. The supporting bar hanging projections 375 are protrusively formed on both ends of the manipulating member 37, thereby contacting with the supporting bar 327. Meanwhile, it is desirable that the supporting bar 327 be formed of a piano wire so as to maintain predetermined elasticity and strength.

Additionally, there are further provided protrusions 318, 319, 329 and 330 for fixing positions of the upper and lower gear shafts 39a and 39b through the upper shaft guides 311 and 321 and the lower shaft guides 313 and 323.

It is desirable that the protrusions 318, 319, 329 and 330 be formed on an outside of the central shaft 40.

An operation of the apparatus for adjusting the rotation speed of the roller will be described below.

If the user moves the manipulating member 37 in upward and downward directions to thereby move the center recessed gear 510 and the lower connection gear 35b internally inserted into the manipulating member 37, the center recessed gear 510 and the lower connection gear 35b are meshed with the two-stage shift gear 520 and the lower roller gear 34b or separated therefrom, so that a transfer direction of the rotational force is changed in forward or backward direction and transferred. Specifically, in case that the high-speed gear 521 of the two-stage shift gear 520 is meshed with the center recessed gear 510, the rear gear 511 of the center recessed gear 510 is meshed with the high-speed gear 521 of the two-stage shift gear 520, such that the two-stage shift gear 520 rotates at higher angular velocity.

In addition, since the low-speed gear 522 of the two-stage shift gear 520 is inserted into the recessed portion 512 of the center recessed gear 510 and the motor gear 36 is meshed with the front gear 513 of the center recessed gear 510, dynamic force can be transferred without any obstruction.

Meanwhile, since the low-speed gear 522 of the two-stage shift gear 520 is again meshed with the lower roller gear 34b, the upper and lower rollers 33a and 33b rotate at the same revolutions.

The upper shaft guides 311 and 321 and the lower shaft guides 313 and 323 are formed on the supporting frame 31b and the motor fixing member 32 in the arc shape so as to guide the movement of the upper and lower gear shafts 39a and 39b.

Meanwhile, the change of the positions of the connection gear 35 and the central recess gear 510 results in that of the mesh between the motor gear 36 and the roller gears 34 to thereby change the transfer direction of the rotational force, so that the forward and backward rotations of the rollers 33 are manipulated to the user's intentions.

In order to stably support the changed position of the manipulating member 37, the fixing spring 38 is inserted into the spring guide 374 so that a predetermined force is applied to the manipulating member 37.

Additionally, after the manipulating member 37 is moved upward or downward, the manipulating member 37 is hung between the supporting bar 327 and the supporting bar hanging projections 375, so that the position of the manipulating member 37 is fixed.

Further, after the upper and lower gear shafts 39a and 39b moves to one side, the protrusions 318, 319, 329 and 330 firmly fix the positions of the upper and lower gear shafts 39a and 39b so that the upper and lower gear shafts 39a and 39b cannot be released unless a force is applied beyond a predetermined strength. Meanwhile, to make it possible to move the positions of the upper and lower gear shafts 39a and 39b by a predetermined force, it is desirable that at least one of the manipulating member 37 and/or the upper gear shaft 39a and the lower gear shaft 39b and/or the motor fixing member 32 and the right supporting frame 31b be formed of a plastic material with elasticity.

Figure 7:
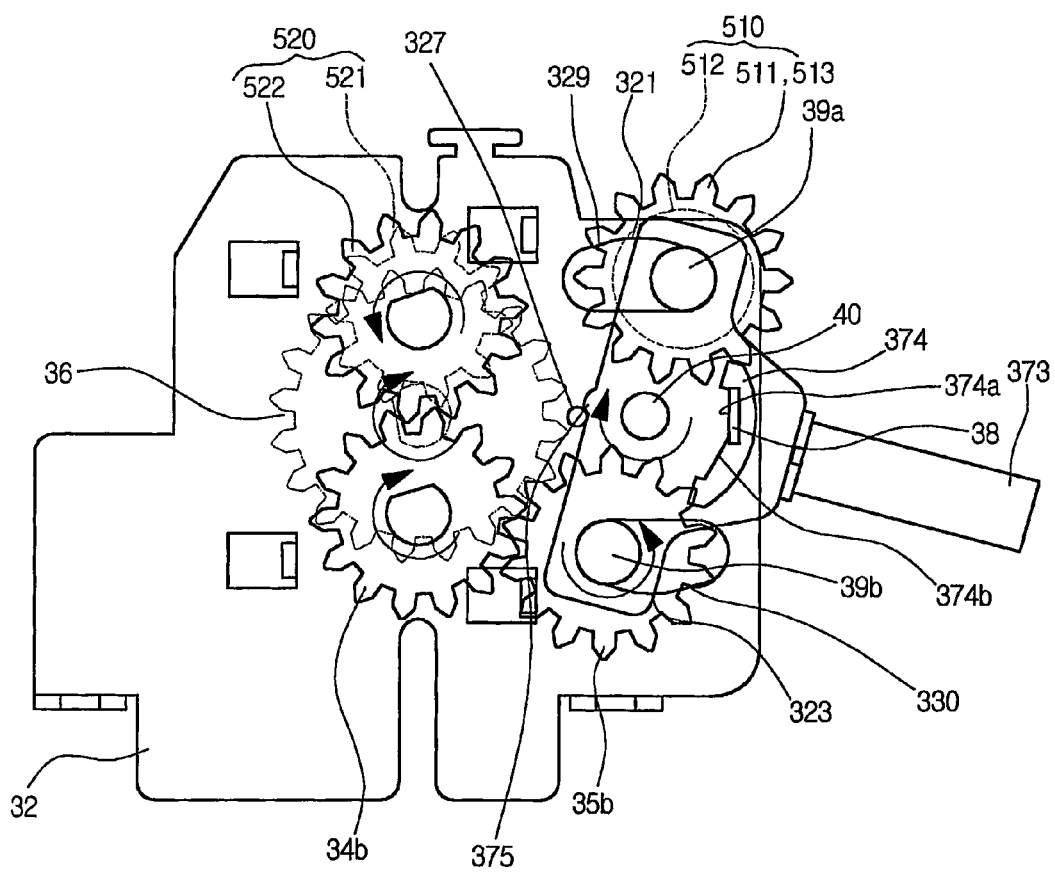
FIGS. 7 to 9 are views showing a forward rotation state, a backward rotation state and a stopped state of the roller in the laminator according to the first embodiment of the present invention, respectively.

FIG. 7 is a view showing a forward rotation state of the roller in the laminator according to the first embodiment of the present invention.

Referring to FIG. 7, the manipulating member 37 is in a state rotated in a clockwise direction due to an external force of a user.

A torque generated from the motor M is transferred to the motor gear 36 due to the movement caused by the external force, and the torque of the motor gear 36 is transferred to the lower connection gear 35b meshed with the motor gear 36. The lower connection gear 35b rotates the lower roller gear 34b meshed therewith, so that the lower roller 33b rotates. In addition, the lower connection gear 35b is meshed with the low-speed gear 522 of the two-stage shift gear 520, and the upper roller 33a connected with the low-speed gear 522 also rotates at the same rotation speed as the lower roller 33b.

At this time, the lower roller gear 34b and the low-speed gear 522 should have the same number of teeth.

Further, arrows drawn around the shafts represent the rotational directions of respective gears. Since the structure in which the manipulating member 37 can be fixed without vibration due to the movement of the motor M is shown in the related art, its detailed description will be omitted. However, the structure of fixing the manipulating member 37 in accordance with the present invention is not limited to the above structure, and those skilled in the art can easily make other structures of fixing the manipulating member 37.

Figure 8:
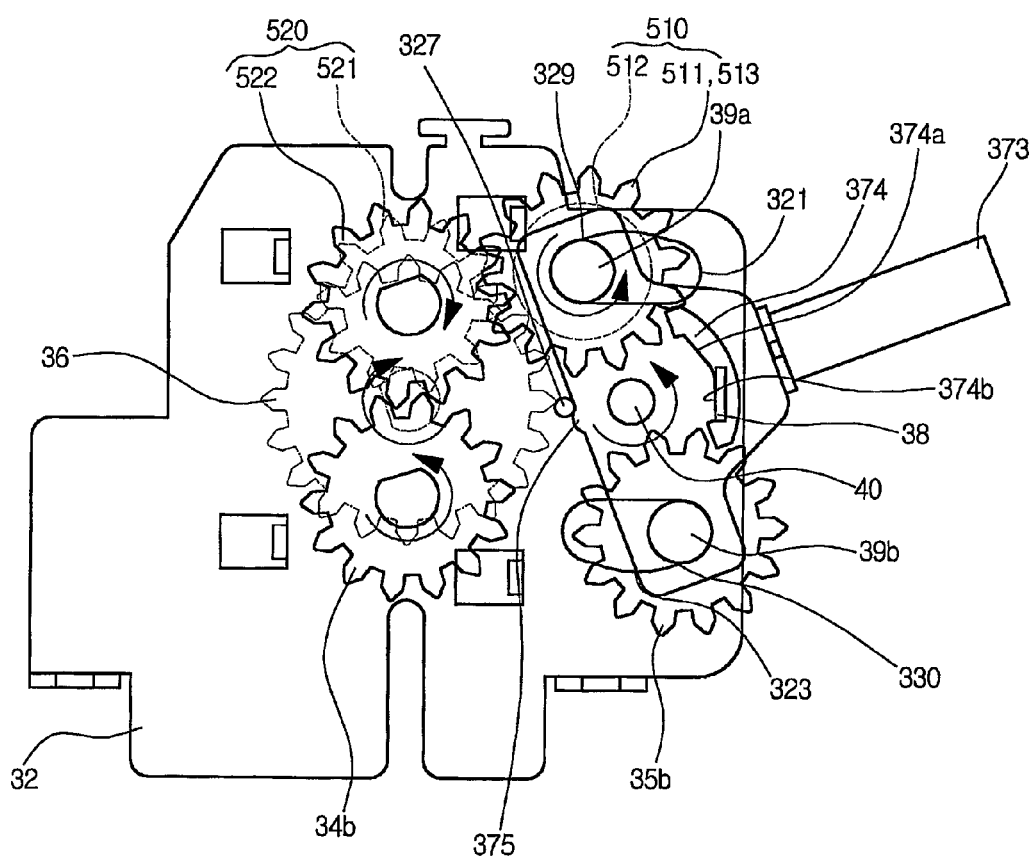

FIG. 8 is a view showing a backward rotation state of the roller in the laminator according to the first embodiment of the present invention.

Referring to FIG. 8, the manipulating member 37 is in a state moved upward due to an external force of a user.

A torque generated from the motor M is transferred to the motor gear 36 due to the movement caused by the external force, and the torque of the motor gear 36 is transmitted to the front gear 511 of the center recessed gear 510 meshed with the motor gear 36. The rotation of the center recessed gear 510 results in that of the high-speed gear 521 of the two-stage shift gear 520 meshed with the rear gear 513 of the center recessed gear 510. The upper roller 33a rotates due to the rotation of the high-speed gear 521.

In addition, since the low-speed gear 522 formed in a single body together with the high-speed gear 521 is meshed with the lower roller gear 34b, the lower roller 33b coupled with the lower roller gear 34b also rotates at the same rotation speed as the upper roller 33a.

At this time, the lower roller gear 34b and the low-speed gear 522 should have the same number of teeth. The number of teeth of the high-speed gear 521 should be smaller than that of the low-speed gear 522.

Meanwhile, although not shown, in case that the number of teeth of the front gear 511 is equal to that of the lower connection gear 35b and the number of number of the rear gear 513 is larger than that of the front gear 511, the roller 33 has faster angular velocity in the backward rotation than in the forward rotation.

Arrows drawn around the shafts represent the rotational directions of respective gears. Since the structure in which the manipulating member 37 can be fixed without vibration due to the movement of the motor M is shown in the related art, its detailed description will be omitted. However, the structure and method of fixing the manipulating member 37 in accordance with the present invention is not limited to the above structure and method.

Figure 9:
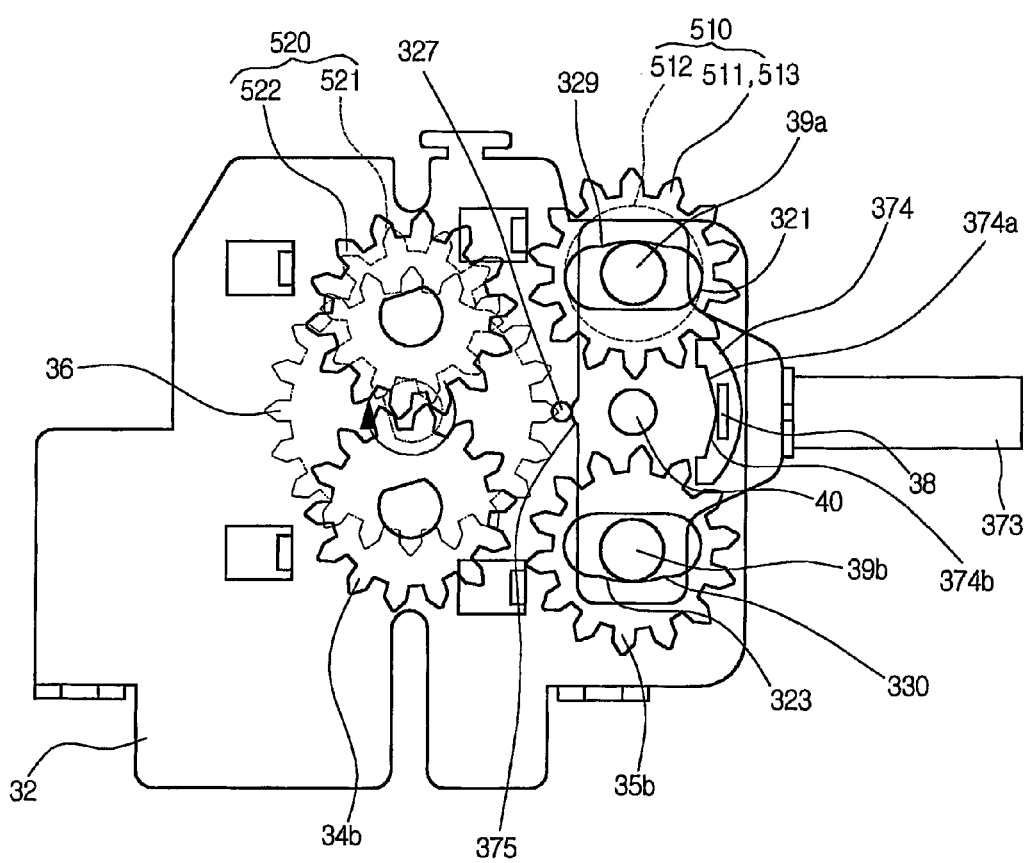

FIG. 9 is a view showing a stopped state of the roller in the laminator according to the first embodiment of the present invention.

Referring to FIG. 9, since the manipulating member 37 is maintained in a neutral state, the rotational force generated from the motor gear 36 is not transferred to the center recessed gear 510 or the lower connection gear 35b, such that the roller 33 does not rotate.

Second Embodiment

An apparatus for adjusting a rotation speed of roller in a laminator in accordance with a second embodiment of the present invention is identical to the above-described first embodiment in many respects. However, instead of the center recessed gear, a conventional general gear is used as the upper connection gear 35a. In addition, instead of the two-stage shift gear, a general gear is used as the upper roller gear 34a, and a two-stage shift gear 620 is used as the motor gear.

Figure 10:
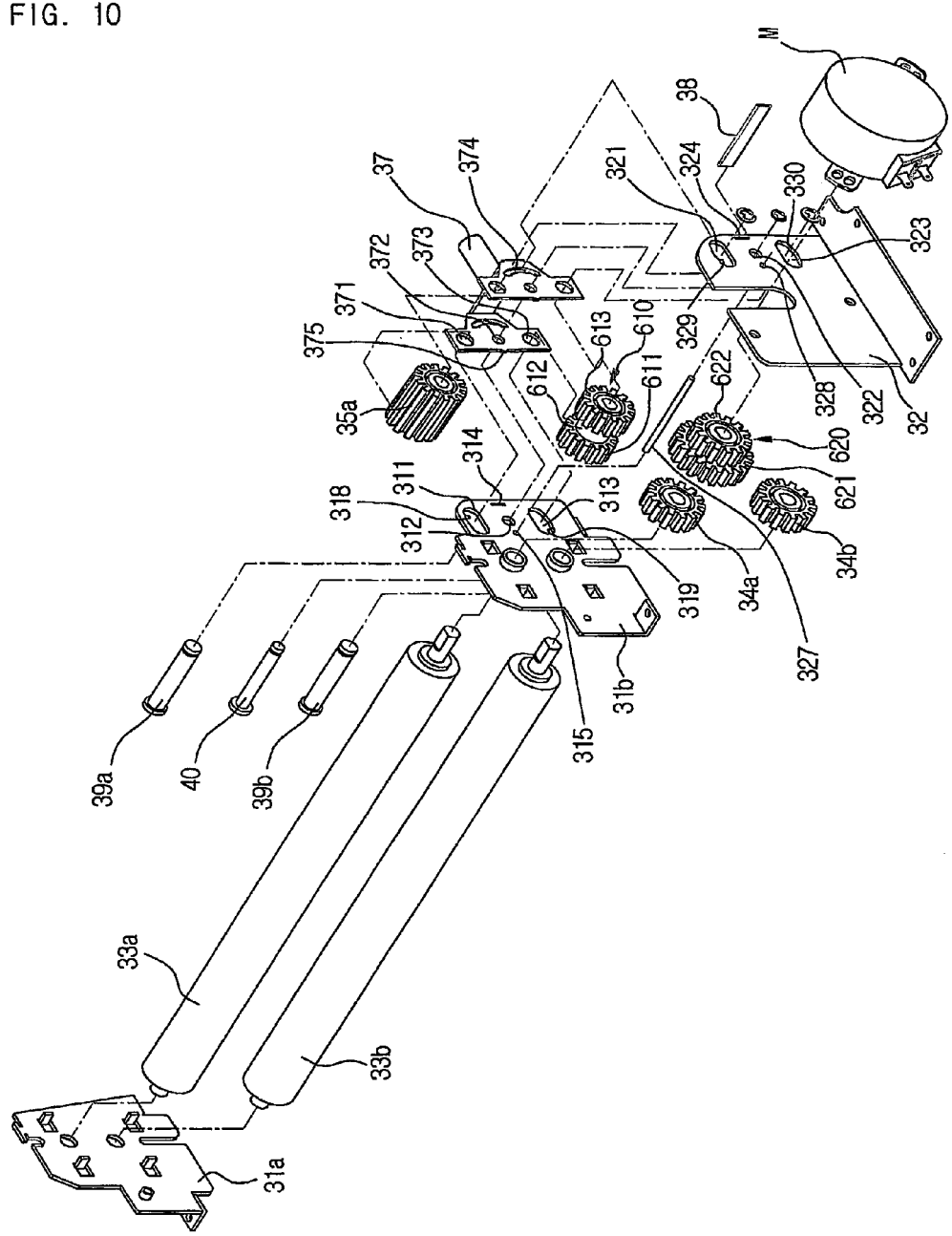
FIG. 10 is an exploded perspective view of an apparatus for regulating rotation speed of roller in a laminator according to a second embodiment of the present invention.

FIG. 10 is an exploded perspective view of an apparatus for regulating a rotation speed of roller in a laminator according to a second embodiment of the present invention.

Referring to FIG. 10, the central recess gear 610 includes a front gear 613 meshed with the low-speed gear 622 of the two-stage shift gear 620, a recessed portion 612 for eliminating an obstruction to the rotation of the high-speed gear 621 when the front gear 613 and the low-speed gear 622 are meshed with each other, and a rear gear 611 meshed with the lower roller gear 34b. Further, the two-stage shift gear 620 is connected with the motor M on the same axis and rotates at the same rotation speed and the same rotational direction as the motor M. The two-stage shift gear 620 includes a high-speed gear 621 meshed with the upper connection gear 35a and a low-speed gear 622 meshed with the front gear 613 of the center recessed gear 610.

Hereinafter, an operation of the second embodiment will be described briefly. When the roller rotates in a forward direction, the low-speed gear 622 of the two-stage shift gear 620 is meshed with the front gear 613 of the center recessed gear 610 and the rear gear 611 of the center recessed gear 610 is meshed with the lower roller gear 34b. The high-speed gear 621 of the two-stage shift gear 620 is inserted into the recessed portion 612 of the center recessed gear 610, such that the rotation of the high-speed gear 621 is not obstructed.

When the roller rotates in a backward rotation, the upper connection gear 35a is meshed with the high-speed gear 621 of the two-stage shift gear 620 and the upper roller gear 34a, such that a torque generated from the two-stage shift gear 620 is transferred to the upper roller gear 34a and the lower roller gear 34b.

At this time, assuming that the number of teeth of the center recessed gear 610 is equal to that of the upper connection gear 35a, since the number of teeth of the high-speed gear 621 is larger than that of the low-speed gear 622, the roller rotates at higher angular velocity in the backward rotation than in the forward rotation.

Figure 11:
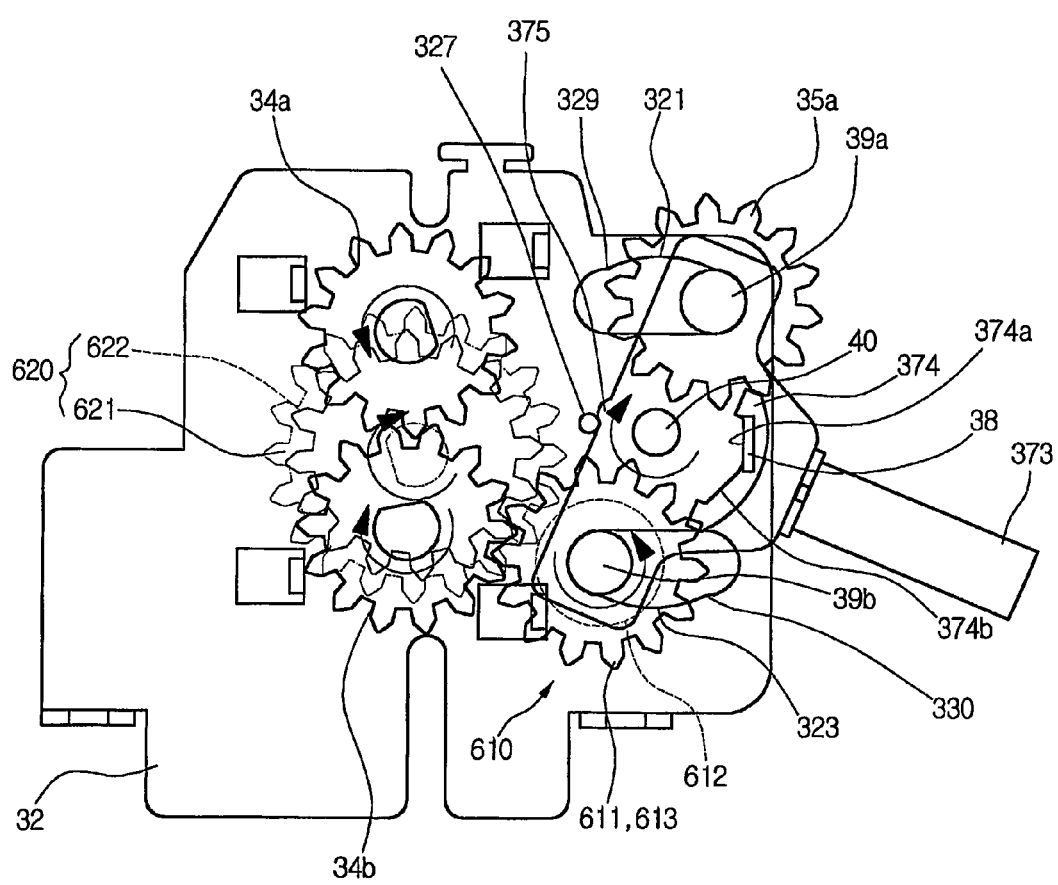
FIGS. 11 to 13 are views showing a forward rotation state, a backward rotation state and a stopped state of the roller in the laminator according to the second embodiment of the present invention, respectively.
Figure 12:
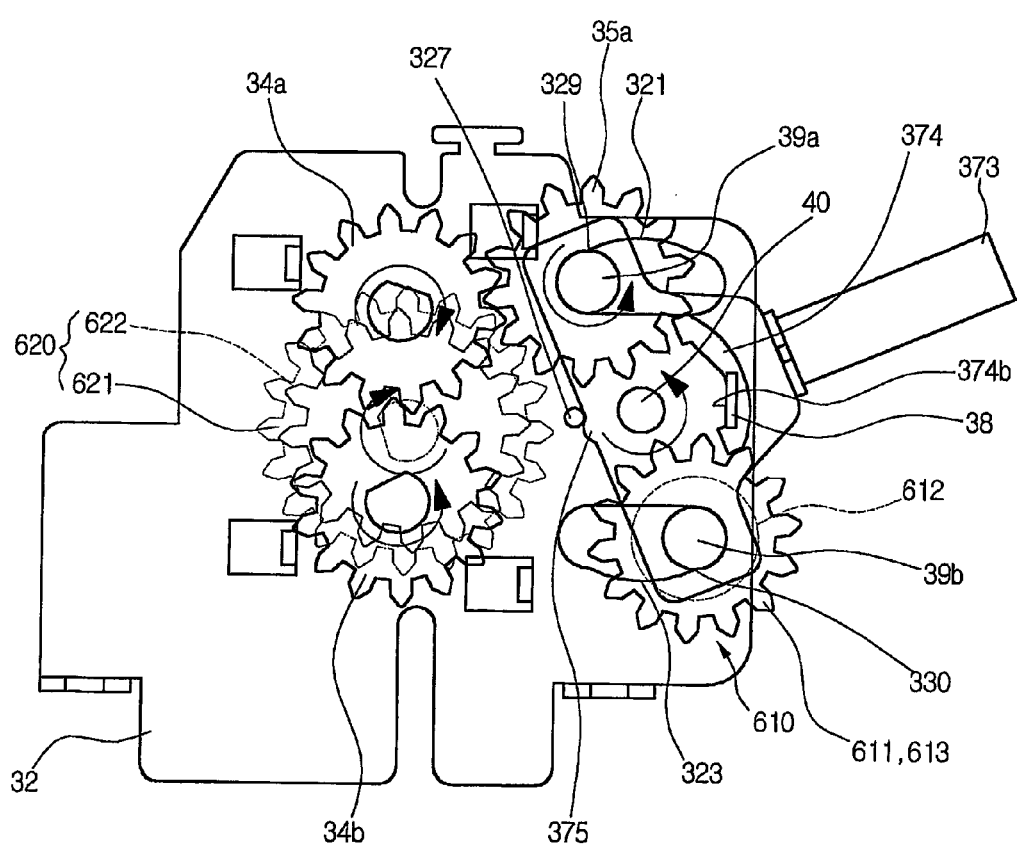
Figure 13:
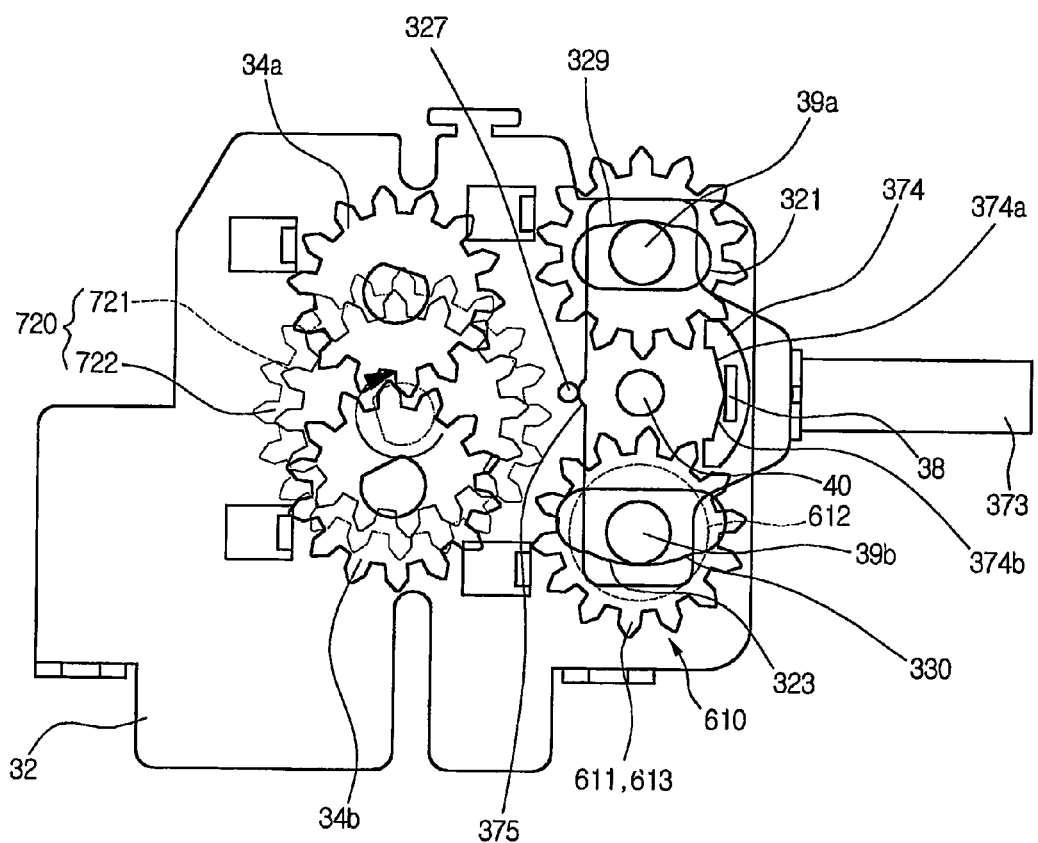

FIGS. 11 to 13 are views showing a forward rotation state, a backward rotation state and a stopped state of the roller in the laminator according to the second embodiment of the present invention, respectively.

Referring to FIG. 11, the front gear 613 of the center recessed gear 610 is meshed with the low-speed gear 622 of the two-stage shift gear 620, and the rear gear 611 of the center recessed gear 610 is meshed with the lower roller gear 34b. The high-speed gear 621 of the two-stage shift gear 620 is inserted into the recessed portion 612 of the center recessed gear 610. Particularly, the recessed portion 612 allows the low-speed gear 622 to rotate without any obstruction, and the high-speed gear 621 is merely inserted into the recessed portion 612.

Consequently, the torque generated from the motor M is transferred to the lower roller gear 33b through the low-speed gear 622, the front gear 613, the rear gear 611 and the lower roller gear 34b. The upper roller gear 34a meshed with the lower roller gear 34b also rotates at the same revolutions as the lower roller gear 34b, such that the upper and lower rollers 33 rotate at the same revolutions.

FIG. 12 is a view showing the backward rotation state of the roller. Referring to FIG. 12, the upper connection gear 35a is meshed with the high-speed gear 621 of the two-stage shift gear 620 and the upper roller gear 34a. The upper roller gear 34a is meshed with the lower roller gear 34b.

The roller 33 rotates under such a meshed state.

In the second embodiment of the present invention, assuming that the number of teeth of the center recessed gear 610 is equal to that of the upper connection gear 35a and the number of the upper roller gear 34a is equal to that of the lower roller gear 34b, there occurs a difference between the forward rotation of the roller and the backward rotation as much as a difference between the number of teeth of the high-speed gear 621 and that of the low-speed gear 622 and a difference of their linear velocities.

FIG. 13 is a view showing the stopped state of the roller.

Referring to FIG. 13, the manipulating member 37 is maintained in a neutral state due to an external force of a user.

In such a neutral state, the motor gear 36 to which the torque generated from the motor M is transferred is not meshed with any gears, such that the roller 33 does not rotate.

Third Embodiment

An apparatus for adjusting rotation speed of roller in a laminator in accordance with a third embodiment of the present invention is identical to the above-described second embodiment in many respects. However, instead of the center recessed gear (610, see FIG. 10) used as the lower connection gear, a one-side recessed gear 710 is used, and only formation directions of the low-speed gear and the high-speed gear are changed in the two-stage shift gear (620, see FIG. 10) used as the motor gear.

Figure 14:
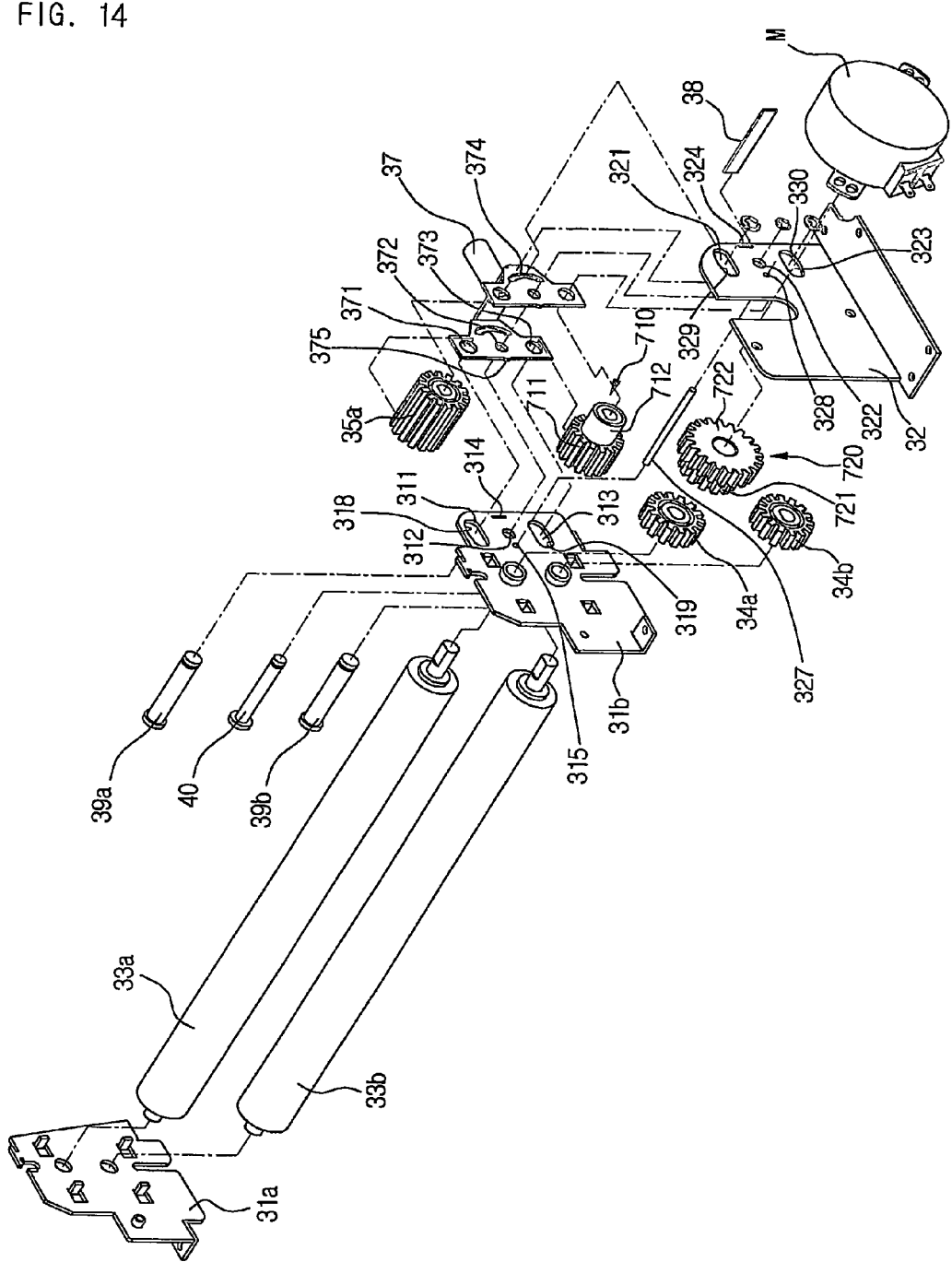
FIG. 14 is an exploded perspective view showing an apparatus for regulating rotation speed of roller in a laminator according to a third embodiment of the present invention.

FIG. 14 is an exploded perspective view of the third embodiment of the present invention.

Referring to FIG. 14, the one-side recessed gear 710 as the lower connection gear includes a recessed portion 712 formed in front, and a rear gear 711 formed behind. A two-stage shift gear 720 as the motor gear includes a high-speed gear 722 formed in front and a low-speed gear 721 formed behind.

Hereinafter, rotation states of the roller will be described with reference to the above construction.

In case that the roller rotates in a forward rotation, the low-speed gear 721 of the two-stage shift gear 720 is meshed with the rear gear 711 of the one-side recessed gear 710, and the high-speed gear 722 of the two-stage shift gear 720 is inserted into the recessed portion 712, such that the two-stage shift gear 720 and the one-side recessed gear 710 rotate without any obstruction. Additionally, the rear gear 711 of the one-side recessed gear 710 is meshed with the lower roller gear 34b as well as the low-speed gear 721.

In such a state, a torque generated from the motor M is transferred to the lower roller 33b through the low-speed gear 721, the rear gear 711 of the one-side recessed gear 710 and the lower roller gear 34b, and the lower roller gear 34b is meshed with the upper roller gear 34a such that the torque is also transferred to the upper roller 33a connected with the upper roller gear 34a. As a result, the upper and lower rollers 33 rotate at the same rotation speed.

In case that the roller rotates in a backward rotation, assuming that the number of teeth of the upper roller gear 34a is equal to that of the lower roller gear 34b and the number of teeth of the rear gear 711 is equal to that of the upper connection gear 35a, the roller rotates as fast as a difference of the number of teeth between the low-speed gear 721 and the high-speed gear 722 and their rotation angles.

Because of these operations, while a laminating film operates slowly in a normal operation state, the roller gears 34a and 34b rapidly rotates in the backward direction when jammed film needs to be removed.

Figure 15:
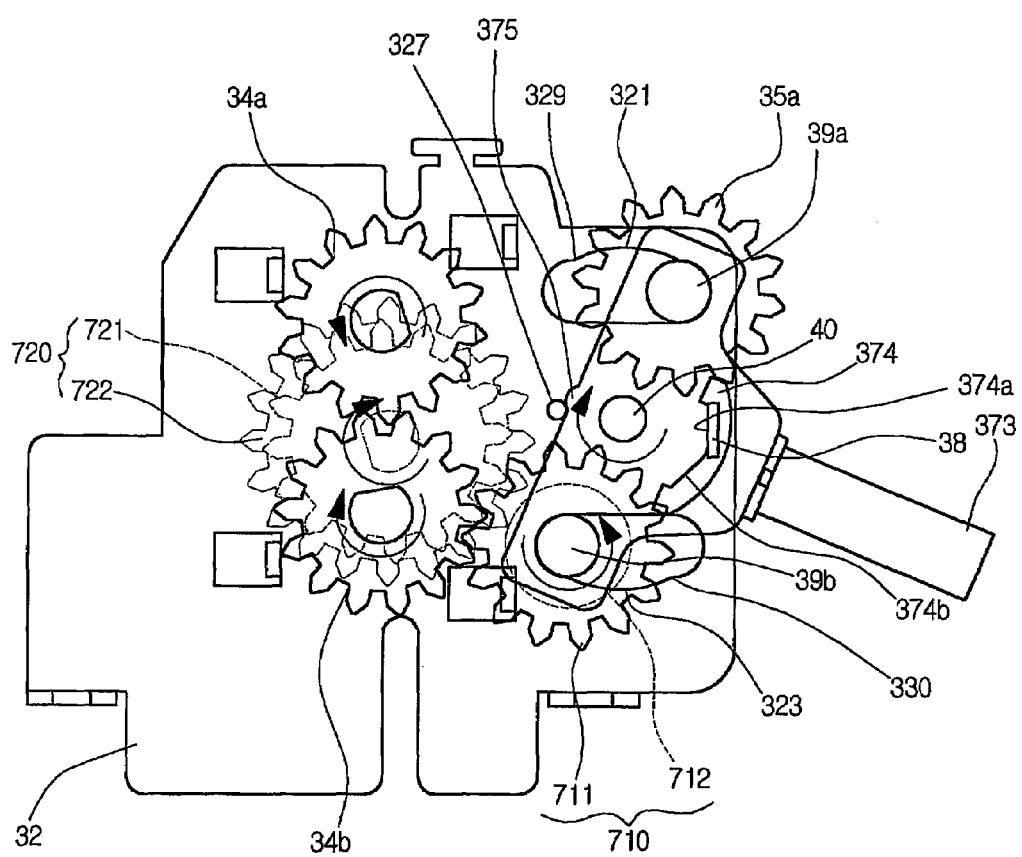
FIGS. 15 to 17 are views showing a forward rotation state, a backward rotation state and a stopped state of the roller in the laminator according to the third embodiment of the present invention.
Figure 16:
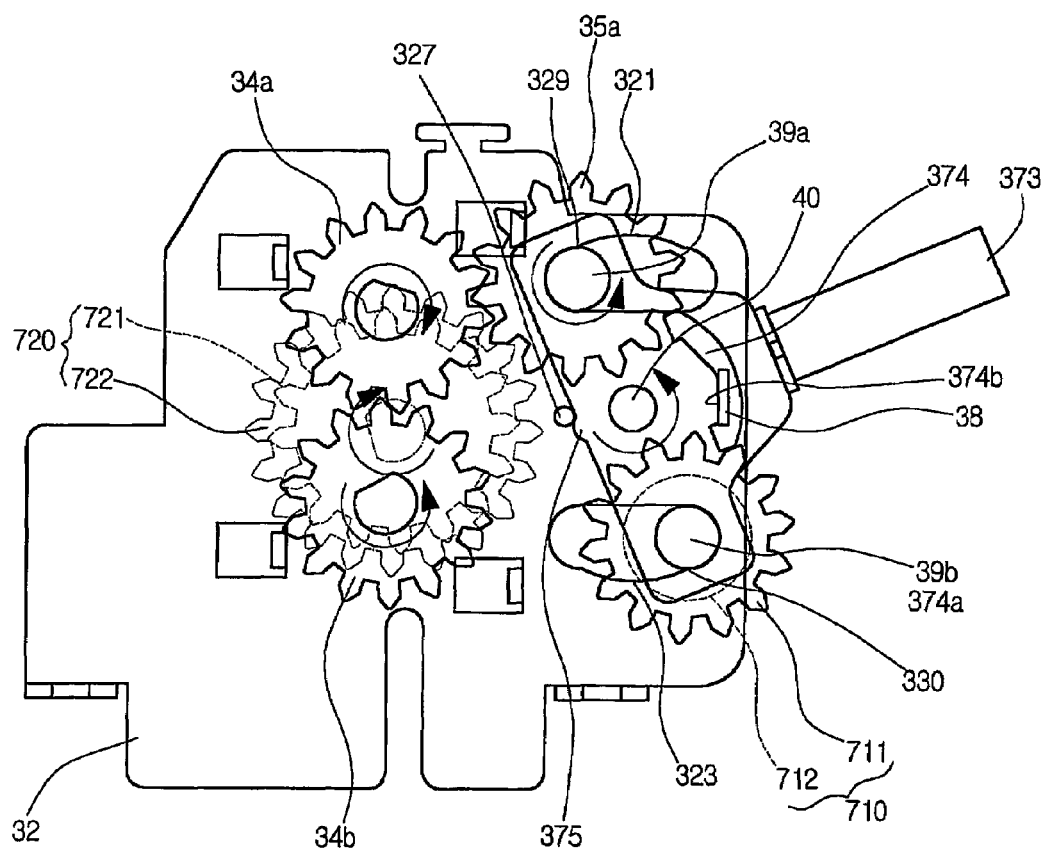
Figure 17:
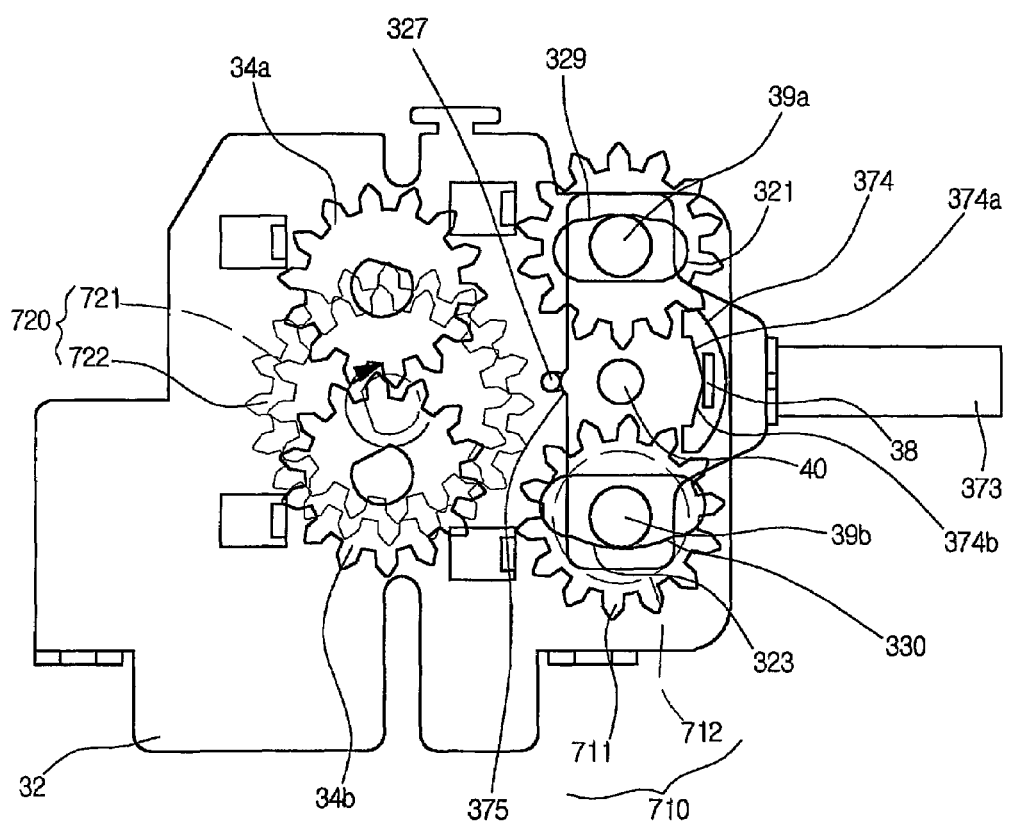

FIGS. 15 to 17 are views showing a forward rotation state, a backward rotation state and a stopped state of the roller in the laminator according to the third embodiment of the present invention.

In FIG. 15, there is shown the forward rotation state of the roller. The low-speed gear 721 of the two-stage shift gear 720 is meshed with the rear gear 711 of the one-side recessed gear 710, and the rear gear 711 is meshed with the lower connection gear 34b. Additionally, the lower connection gear 34b is meshed with the upper connection gear 34a. The high-speed gear 722 of the two-stage shift gear 720 is inserted into the recessed portion 712 of the one-side recessed gear 710.

In such a meshed state, the roller 33 rotates at a low speed since a torque generated from the motor M is transferred to the roller 33 from the low-speed gear 721.

In FIG. 16, there is shown the backward rotation state of the laminator. The high-speed gear 722 of the two-stage shift gear 720 is meshed with the upper connection gear 35a, and the upper connection gear 35a is also meshed with the upper roller gear 34a.

In such a meshed state, the roller 33 rotates at a low speed since a torque generated from the motor M is transferred to the roller 33 from the high-speed gear 722.

In FIG. 17, there is shown the stopped state of the laminator. The two-stage shift gear 720 used as the motor gear is not meshed with any gears, such that the roller 33 is maintained in the stopped state.

Fourth Embodiment

An apparatus for adjusting a rotation speed of roller in a laminator in accordance with a fourth embodiment of the present invention is identical to the above-described first embodiment in many respects. However, instead of the center recessed gear (510, see FIG. 6), a one-side recessed gear 810 is used, and a two-stage shift gear 820 is used as the upper connection gear.

Figure 18:
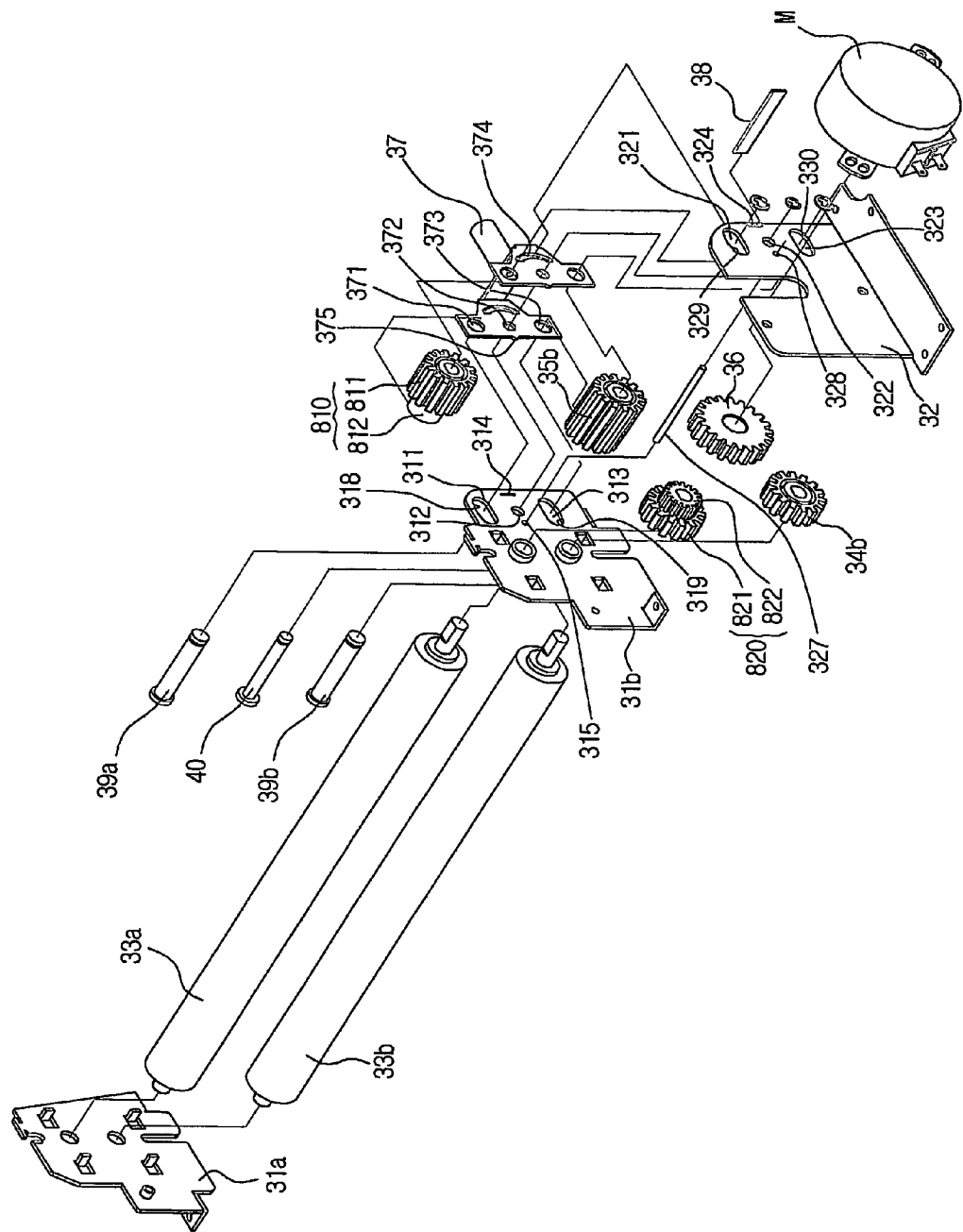
FIG. 18 is an exploded perspective view of an apparatus for regulating rotation speed of roller in a laminator according to a fourth embodiment of the present invention.

FIG. 18 is an exploded perspective view of the apparatus for adjusting rotation speed of a roller in a laminator according to the fourth embodiment of the present invention.

Referring to FIG. 18, many portions are identical to the first embodiment, and the one-side recessed gear 810 used as the upper connection gear includes a front gear 811 to which a torque is applied from a motor gear 36, and a recessed portion 812 formed at a rear portion of the front gear 811. Additionally, the two-stage shift gear 820 is used as the upper roller gear and includes a high-speed gear 822 meshed with the front gear 811 of the one-side recessed gear 810 and a low-speed gear 821 formed at a rear portion of the high-speed gear 822. At this time, the number of teeth of the low-speed gear 821 is larger than that of the high-speed gear.

Hereinafter, the fourth embodiment constructed as above will be described. In case that the roller 33 rotates in a forward direction, the motor gear 36, the lower connection gear 35b and the lower roller gear 34b are meshed with each other, such that a torque is transferred through the described-above general procedures. The lower roller gear 34b is meshed with the low-speed gear 821 such that the upper roller 33a also rotates at the same rotation speed.

However, in case that the roller 33 rotates in a backward direction, the motor gear 36, the front gear 811 of the one-side recessed gear 810 and the high-speed gear 822 are meshed with each other. The low-speed gear 821 is internally inserted into the recessed portion 812 such that there is no contact portion. As a result, the torque is transferred without any obstruction.

Comparing the forward direction of the roller with the backward direction, assuming that the number of teeth of the front gear 811 is equal to that of the lower connection gear 35b and the number of teeth of the lower roller gear 34b is equal to that of the low-speed gear 821, the rotation speed in the forward rotation is different from that in the backward rotation as much as a rotating variation according to a difference between the number of teeth of the low-speed gear 821 and that of the high-speed gear 822, i.e., a difference between their rotation angles.

Figure 19:
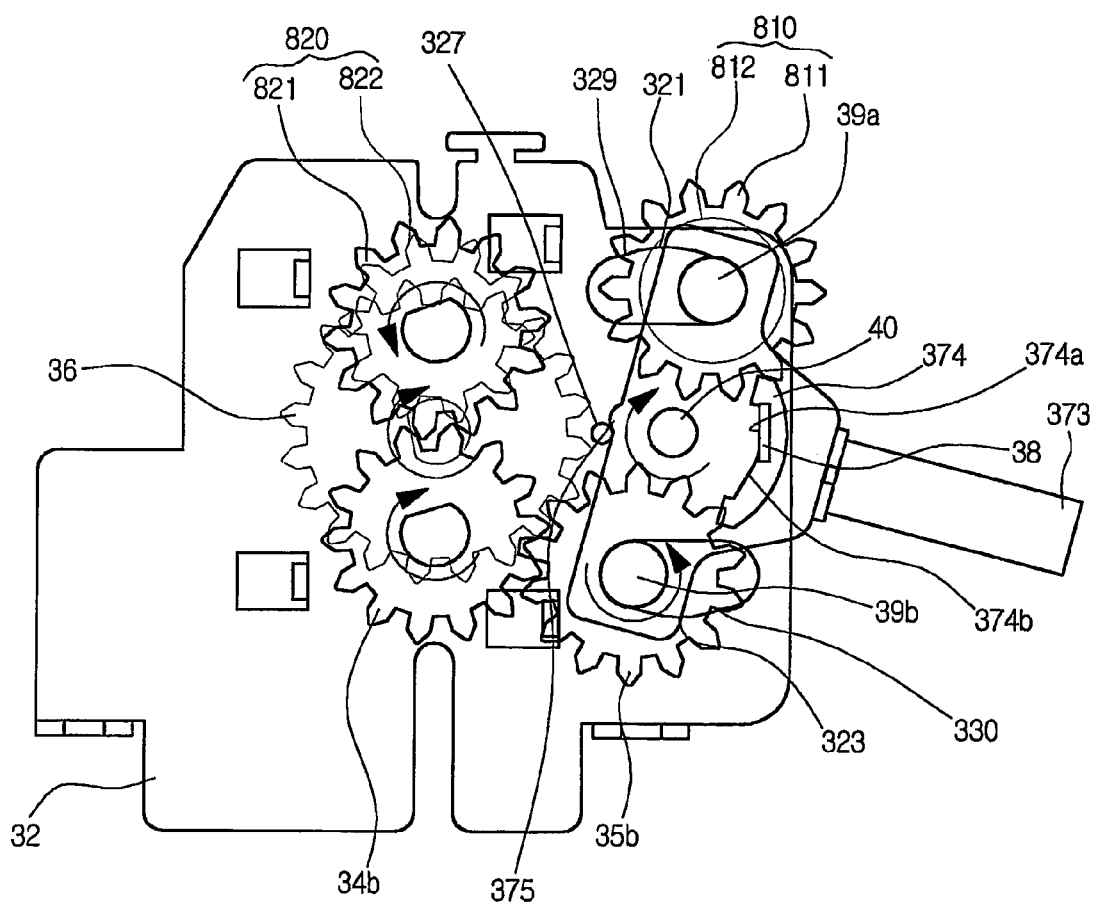
FIGS. 19 to 21 are views showing a forward rotation state, a backward rotation state and a stopped state of the roller in the laminator according to the fourth embodiment of the present invention.
Figure 20:
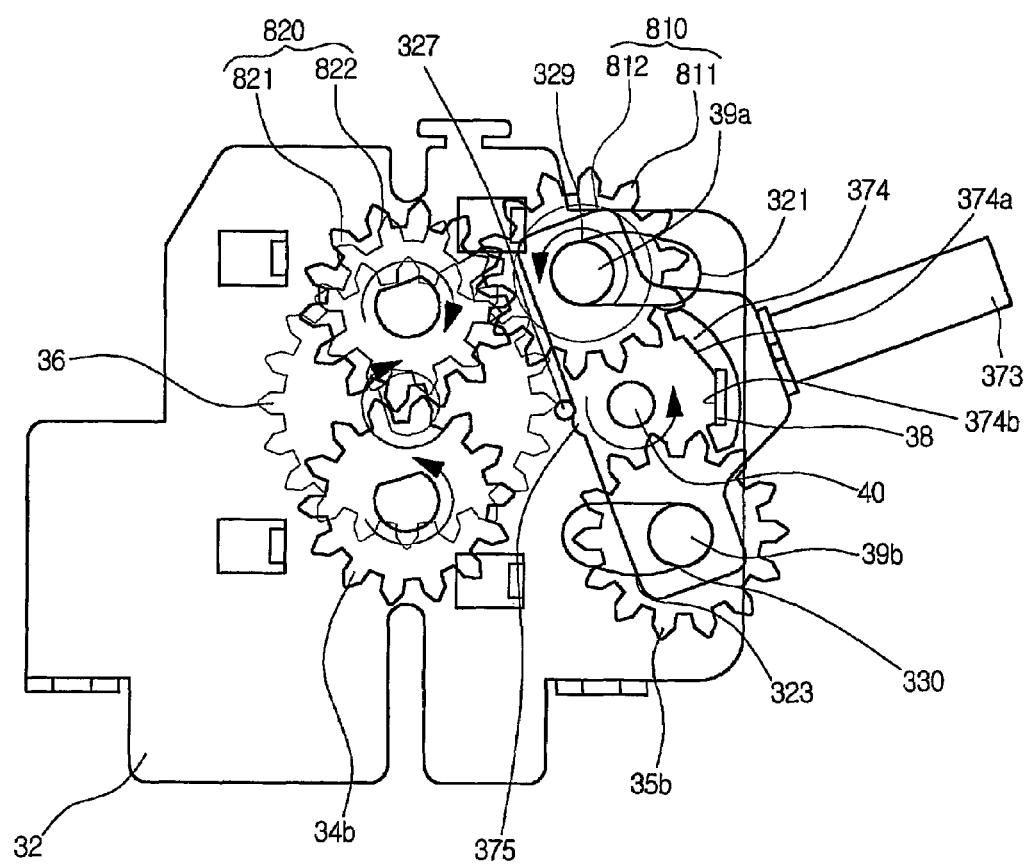
Figure 21:
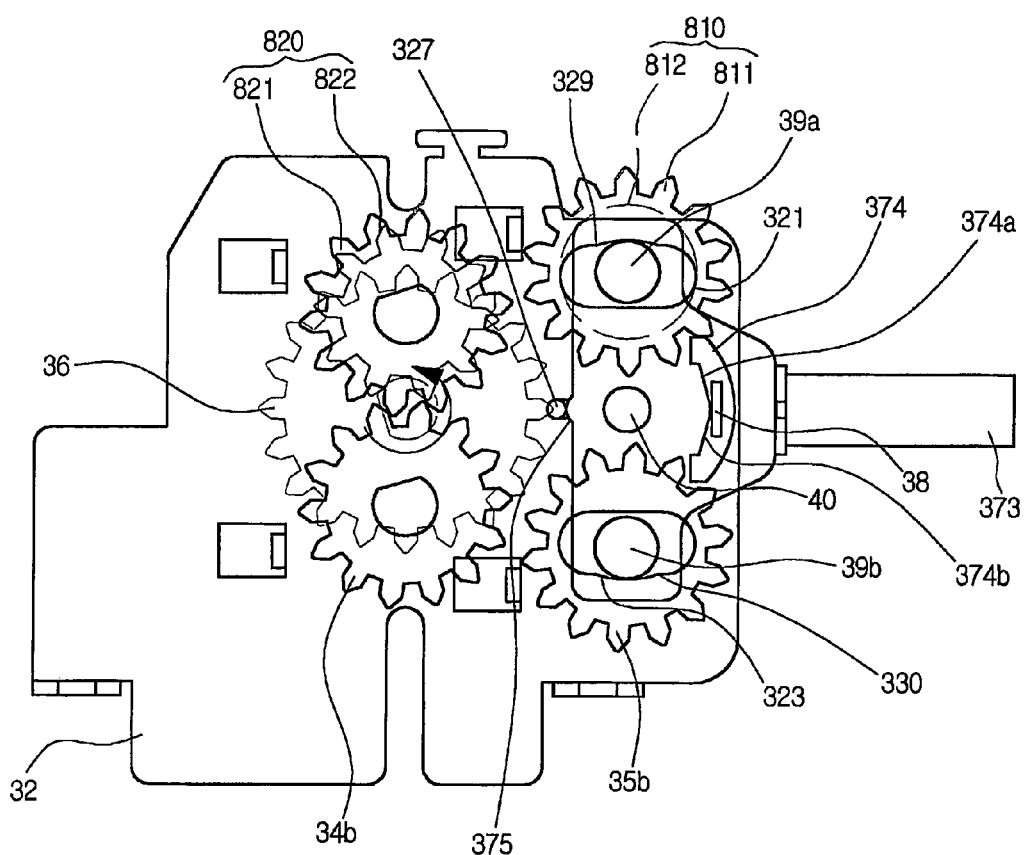

FIGS. 19 to 21 are views showing a forward rotation state, a backward rotation state and a stopped state of the roller in the laminator according to the fourth embodiment of the present invention.

In FIG. 19, there is shown the forward rotation of the roller. Referring to FIG. 19, the motor gear 36 is meshed with the lower connection gear 35b, and the lower connection gear 35b is also meshed with the lower roller gear 34b. As a result, a torque is transferred through the above-described general procedures.

Additionally, the lower connection gear 35b is meshed with the low-speed gear 821 of the two-stage shift gear 820, such that the upper roller 35a rotates at the same revolutions as the lower roller 35b. For this, the number of teeth of the lower connection gear 35b should be equal to that of the low-speed gear 821.

In FIG. 20, there is shown the backward rotation of the roller. Referring to FIG. 20, the motor gear 36 is meshed with the front gear 811 of the one-side recessed gear 810 and the front gear 811 is also meshed with the high-speed gear 822 of the two-stage shift gear 820. At this time, the low-speed gear 821 is also meshed with the lower connection gear 34b to thereby transfer the torque.

As a result, since the high-speed gear 822 rotates at larger revolutions by a difference in the number of teeth between the high-speed gear 822 and the low-speed gear 821, the entire rotation speed of the roller 33 is higher than the forward rotation.

In FIG. 21, there is shown the stopped state of the roller. Referring to FIG. 21, since the motor gear 36 is not meshed with any gear, the roller 36 does not rotate.

In the various embodiments described above, there is provided a construction in which one of the upper or lower connection gears is the recessed gear, at least one of the motor gear and the roller gear is the two-stage shift gear, and the forward rotation of the roller is different from the backward rotation. Although the preferred embodiments of the present invention have been disclosed for illustrative purposes, those skilled in the art will appreciate that various modifications, additions and substitutions can be made without departing from the scope and spirit of the invention as defined in the accompanying claims.

INDUSTRIAL APPLICABILITY

According to the present invention, a film jammed within a laminator can be more rapidly removed in a normal operation state by varying a rotation angles in forward and backward rotations of the roller.

Since it is possible to make the roller have different rotation speed in the forward rotation from that in the backward rotation by simply changing the shapes of gears, reliability of the products are increased.

Further, by providing gears with different number of teeth from each other, it is possible to implement various speeds even at a fixed rotation speed of the motor.

What is claimed is:

1. An apparatus for adjusting a rotation speed of a roller in a laminator, the laminator including a pair of rollers, a pair of connection gears connected to one end of the rollers and forming one meshed pair, a motor fixing member and a motor, a motor gear fixed to a rotational axis to transfer a rotational force to the connection gears, and a manipulating member for manipulating a meshed state between the motor gear and the connection gears by moving the connection gear, wherein at least one of the roller gears and the motor gears is a two-stage shift gear, the two-stage shift gear having the same shaped teeth and formed in two stages, and the connection gear to be meshed with a first stage gear of the two-stage shift gear is a recessed gear, the recessed gear including a gear portion meshed with the first stage gear and a recessed portion in which an outer circumference is recessed so as to place a second gear of the two-stage shift gear therein.

2. The apparatus of claim 1, wherein the two-stage shift gear is formed in a single body.

3. The apparatus of claim 1, wherein the recessed gear is formed in a single body.

4. The apparatus of claim 1, further comprising a fixing means for fixing a position of the connection gear after the position of the connection gear is adjusted using the manipulating member.

5. An apparatus for adjusting a rotation speed of a roller in a laminator, comprising:

a motor and a motor fixing member;

a motor gear to which a torque generated from the motor is transferred;

a pair of rollers for performing a laminating operation by applying heat and/or pressure;

a roller gear provided with a two-stage shift gear having a stepped portion in which at least one of a pair of gears extended to one end of the rollers has same shape and different number of teeth formed on an outer circumference thereof;

a pair of connection gears including at least one recessed gear in which teeth are formed on a predetermined outer circumference meshed with a first stage gear portion of the two-stage shift gear and a recessed portion is formed on an outer circumference where a second stage gear portion is placed, such that a torque generated from the motor gear is selectively transferred to the connection gears;

a manipulating member for fixing the connection gear and applying an external force of a user; and a fixing member for fixing a position of the connection gears.

6. The apparatus of claim 5, wherein the first stage gear portion has the smaller number of teeth than the second stage gear portion.

7. The apparatus of claim 5, wherein the recessed portion is formed at the one end of the recessed gear in case that the first stage gear portion is formed in front.

8. The apparatus of claim 5, wherein the recessed portion is formed at the center of the recessed gear in case that the first stage gear portion is formed behind.

9. An apparatus for adjusting a rotation speed of a roller in a laminator, comprising:

a motor and a motor fixing member;

a motor gear to which a torque is transferred form the motor, the motor gear being provided with a two-stage shift gear having a stepped portion in which same shape and different number of teeth are formed on an outer circumference thereof;

a pair of rollers for performing a laminating operation by applying heat and/or pressure;

a roller gear connected to one end of the roller;

a pair of connection gears including at least one recessed gear in which teeth are formed on a predetermined outer circumference meshed with a first stage gear portion of the two-stage shift gear and a recessed portion is formed on an outer circumference where a second stage gear portion is placed, such that a torque generated from the motor gear is selectively transferred to one of the roller gears;

a manipulating member for fixing the connection gear and applying an external force of a user; and a fixing member for fixing a position of the connection gears.

10. The apparatus of claim 9, wherein the first stage gear portion has the smaller number of teeth than the second stage gear portion.

11. The apparatus of claim 9, wherein the recessed portion is formed at the center of the recessed gear in case that the first stage gear portion is formed in front.

12. The apparatus of claim 9, wherein the recessed portion is formed at one end of the recessed gear in case that the first stage gear portion is formed behind.

* * * * *